United States Patent Office 3,465,448
Patented Sept. 9, 1969

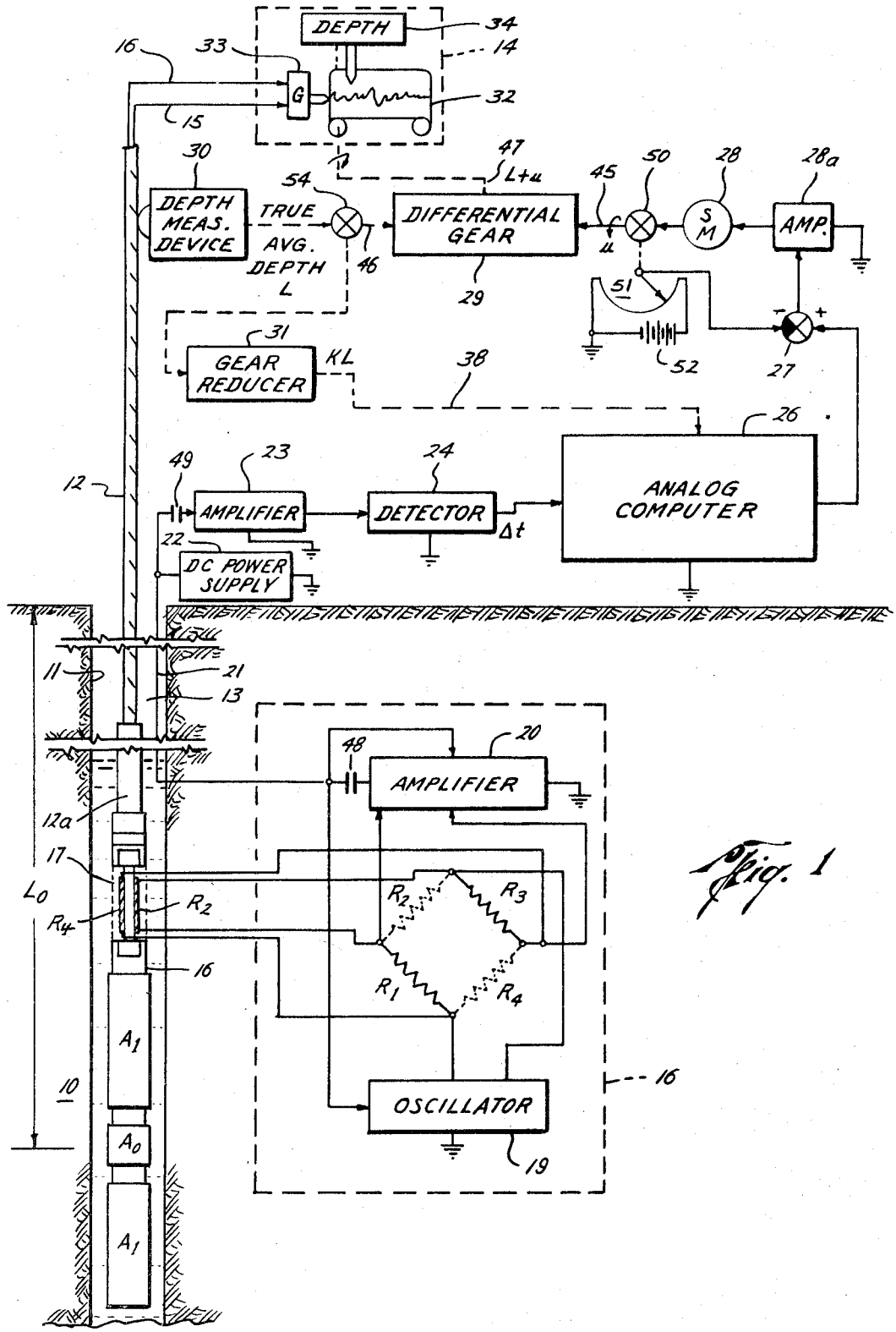

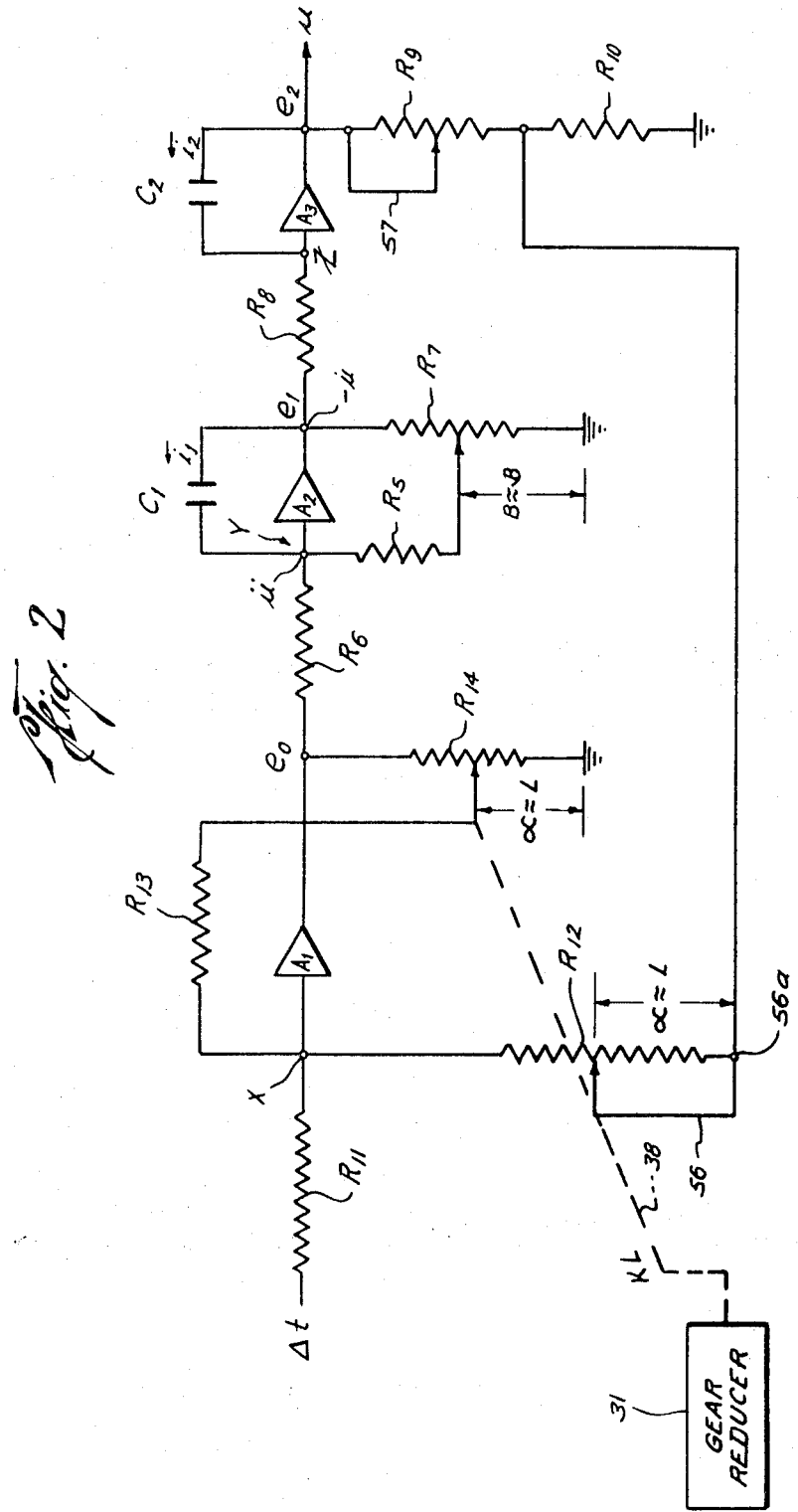

3,465,448
APPARATUS FOR DETERMINING DEPTH IN BOREHOLES
William A. Whitfill, Jr., Houston, Tex., assignor to Schlumberger Technology Corporation, Houston, Tex., a corporation of Texas
Filed Jan. 3, 1966, Ser. No. 518,415
Int. Cl. G01b 3/12, 5/04
U.S. Cl. 33—133                       4 Claims

ABSTRACT OF THE DISCLOSURE

Apparatus for continuously determining changes in depth of a tool in a borehole are disclosed. The tensile force between the tool and its supporting cable is measured, as is the movement of the cable at the surface of the earth. The tension and cable movement measurements are then combined in a computer along with a plurality of constants representative of various characteristics of the cable and its surrounding medium to produce an output signal representative of the movement of the tool due to the changes in tension. The computer solves a second order differential equation which includes inverse and inverse squared functions of the tool depth. Potentiometers which vary directly linear with depth are provided in appropriate feedback paths of the computer to produce these inverse and inverse squared functions. The computer output signal is then combined with the original cable movement measurement to produce a signal representative of the instantaneous changes in depth of the tool.

---

This invention relates to apparatus for accurately and continuously determining the length of an elastic cable under tension and more particularly to methods and apparatus for determining the true position of a tool suspended on the end of an elastic cable as the tool on the end of the cable is moved up and down.

This invention is particularly adapted for use in the logging of a borehole where measurements of the surrounding earth formations are taken at different depths along the borehole. The measurements taken along the length of the borehole are intended to provide indications of oil or gas bearing strata and therefore the depth of the logging or measuring tool below the surface of the earth must be accurately determined at all times so that the measurements taken throughout the borehole may be accurately correlated with the true depth of the logging or measuring tool. The measurements of the earth formations surrounding the borehole are generally taken as the logging or measuring tool is moved up the borehole.

To determine the depth of the logging or measuring device in the borehole, a means of determining the length of cable that is lowered into the borehole may be utilized; that is, the actual number of feet of cable lowered into the borehole by a cable reeling device at the surface of the earth is counted. Many systems have been proposed for measuring the cable length, which gives the position of the measuring or logging tool within the borehole. Some of these are sheave devices located at the surface of the earth which provide a measurement of the length of cable which passes over the sheave. Other systems utilize a sensing device responsive to magnetic marks on the cable along the length of the cable, which system measures the length between the magnetic marks as the cable is payed out or taken in.

However, there are forces that work on the measuring or logging tool within the borehole which cause these cable length indicating devices at the surface of the earth to give inaccurate readings. Some of these forces include the weight of the measuring or logging tool and the weight of the cable which connects it to the cable reeling device at the surface of the earth, the buoyant force of the drilling liquid or mud in the borehole, and the drag or frictional forces applied by both the drilling liquid or mud and by the wall of the borehole to both the cable and the measuring or logging tool.

When investigating earth formations surrounding the borehole, the measuring or logging tool is generally lowered to the bottom of the borehole and the logging measurements are taken as the logging tool moves up the borehole. However, when the cable reeling device at the surface of the earth is stopped, the logging tool at the end of the great length of cable will continue moving downward for some distance due to the inertia of the logging tool and the cable and the elasticity of the cable. However, the depth indicating device at the surface of the earth will stop at the moment the cable reeling device is stopped. As a result, the depth indicating device at the surface of the earth will give an erroneous depth indication of the logging tool at the bottom of the borehole. In addition, when the cable is being reeled in, thus moving the measuring or logging tool up the borehole, the forces acting on the logging tool and the cable will cause the cable to stretch, thus causing the logging tool to be located at a different depth than the depth indicated on the depth indicating device at the surface of the earth.

One method for correcting for depth errors is to utilize a tension measuring device at the surface of the earth, as shown in U.S. Patent No. 3,027,649, granted to Raymond W. Sloan on Apr. 3, 1962. However, an uphole tension device can only provide an average measure of the tension encountered by the logging tool in the borehole because of the thousands of feet of cable between the logging tool and the surface of the earth. A force applied to the logging tool in the borehole would not appear immediately at the surface of the earth in the form of a change in tension because of the great length of cable, and the measured force appearing at the surface of the earth in the form of a tension measurement would be vastly distorted because of damping by the cable. The tension variations occurring at the logging tool in the borehole may be delayed by as much as several seconds from reaching the surface due to this travel time in the cable.

However, a serious error may also occur if the logging tool becomes momentarily stuck against the wall of the borehole as the tool is moving through the borehole. In this instance the logging tool will be at a constant depth while at the same time the depth indicator at the surface of the earth is continually moving, thus introducing an excessive error into the indicated depth. Now, when the logging tool becomes unstuck, the elasticity of the cable will cause the logging tool to move at a great rate beyond the depth indicated by the depth indicating device at the surface of the earth and the logging tool will oscillate before reaching equilibrium. Thus it can be seen that the logging tool may have very rapid changes in depth, which depth changes may be extreme. Since these depth changes are instantaneous, a surface tension measuring device could not accurately determine these depth changes at the time they occurs.

This error introduced by the indeterminate stretching of the cable can be excessive for the accurate determination of the depth of the oil bearing strata.

When the earth strata surrounding the borehole are investigated, the location and quantity of oil sometimes cannot be determined by any one investigating method. In such cases several different investigating methods have to be utilized and the data obtained therefrom combined and analyzed before an oil bearing strata can be located. The apparatus for carrying out the different investigating methods cannot all be lowered into the borehole at the same time under existing investigating procedures. Thus, the various logging tools must sometimes be lowered into the borehole at different times.

To combine all of the various logging readings by the different investigating apparatus in such a manner as to determine the exact location of oil bearing strata, the depth indication of each logging run must correlate very accurately with one another or else the combination, analysis, and computation of the different measurements taken with the different measuring or logging tools will not provide the desired result. To combine these various logging runs in such a way that the computations taken therefrom will provide the desired information, the depth indications from the various logging runs may have to be accurate to within approximately one inch of one another. Since any instantaneous changes of depth by the logging tool could not be accurately determined by a surface tension measuring device alone, the analysis of several different logging runs could lead to inaccurate conclusions when surface tension alone is utilized for depth determinations.

One present-day example of making multiple logging runs in the same borehole concerns the automatic computation of the apparent resistivity $R_{wa}$ of the natural occurring water within the porous formations surrounding the borehole. To obtain $R_{wa}$, a previously recorded induction log is played back in depth synchronism with a sonic log being presently run. The sonic and induction log data are continuously fed to an automatic computer to calculate the value of $R_{wa}$ and this computed $R_{wa}$ is simultaneously recorded with the sonic log. It can be seen that the depth of the sonic and induction logs must be accurate with respect to one another to obtain an accurate calculation of $R_{wa}$.

It is also desirable to have an accurate indication of the velocity of the measuring or logging device moving through the borehole. For example, when a dipmeter tool is run through the borehole to determine the dip of the adjacent earth strata that is, the angle that the bedding plane of the earth strata differs from the horizontal the distance M between signal indications on different circumferential points around the borehole is obtained by moving the dipmeter across a boundary between different earth strata having different resistivity characteristics. This distance M is determined by the formula $$M = M_r \frac{V_d}{V_r}$$

where M is the actual distance between the signal indications, $M_r$ is the indicated distance between the signal indications on the recorder, $V_r$ is the velocity of the recorder at the surface of the earth, and $V_d$ is the average velocity of the dipmeter device over the interval between the indications. It can be seen that if the actual velocity of the dipmeter is different from the recorder velocity, the error in computing M will be given by the formula:

$$\frac{M - M_r}{M_r} = \frac{V_d - V_r}{V_r}$$

Thus when the actual velocity of the dipmeter tool is different from the recorder velocity, an error in the measured dip of the borehole will occur. If, however, the instantaneous depth error is corrected, the velocity depth error will also be corrected. A correction of average depth error on the other hand, would not provide a correction of velocity error.

It has been discovered, however, that by measuring the tension downhole at the tool, the instantaneous changes in depth can be determined and thus, the depth error can be corrected. The equations for this depth correction have been developed in co-pending application Ser. No. 518,370, by William E. Bowers et al., filed on Jan. 3, 1966.

However, another problem arises in connection with solving the second order linear differential equation developed in the above co-pending application. The equation has an inverse function of the length of cable $(1/L)$ and inverse squared function $(1/L^2)$, which must be solved. However, a problem arises in accurately solving an equation with inverse and inverse square functions, since, for example, when the investigating tool is near the surface of the earth, the inverse functions and especially the inverse squared function will approach infinity. Thus, it would be desirable to solve the equation developed in the above named co-pending application without these problems.

It is an object of the invention, therefore, to provide new and improved apparatus for determining the instantaneous depth of a tool within a borehole.

It is another object of the invention to provide new and improved apparatus for determining the instantaneous changes in depth of a tool in a borehole.

It is still another object of the invention to provide new and improved apparatus for continuously and automatically correcting a recording device at the surface of the earth to provide instantaneous values of depth of a tool in a borehole.

It is still another object of the invention to provide new and improved apparatus for performing the above objects by solving an equation having variable terms, including inverse and inverse square terms which vary as a function of cable length, in a manner which provides accurate indications regardless of the length of cable in the borehole.

In accordance with the present invention, apparatus for determining changes in depth of a tool in a borehole comprises first means for measuring at least a fraction of the tension in a cable at a point below the surface of the earth to produce a tension measurement and second means for generating a first signal representative of a function of the depth of a tool in a borehole. The apparatus further comprises third means responsive to the tension measurement and the first signal for generating a second signal indicative of the changes in depth of the tool caused by changes in the measured tension, the third means including linearly variable means responsive to said first signal for varying a parameter of said linearly variable means as a function of depth. By so doing, the second signal indicative of depth changes will be a function of the product of measured tension and tool depth.

For a bettter understanding of the present invention, together with other and further objects thereof, reference is had to the following description taken in connection with the accompanying drawings, the scope of the invention being pointed out in the appended claims.

Referring to the drawings:

FIGURE 1 illustrates a tool in a borehole together with a schematic diagram of apparatus for correcting the depth of a tool in a borehole in accordance with the present invention; and FIGURE 2 illustrates the analog computer circuit utilized in the depth correcting apparatus of the present invention.

Referring to FIGURE 1 of the drawings, there is shown a representative embodiment of apparatus constructed in accordance with the present invention for providing instantaneous corrections of the depth of a tool 10 lowered in a borehole 11 for investigation of the earth formations surrounding borehole 11. The tool 10 is a three-electrode focused electrode system wherein a survey current is emitted from central survey electrode $A_0$ and is confined to path outward from the borehole 11 by a focusing current emitted from focusing electrodes $A_1$ on either side thereof. Thus, the portion of the surrounding earth formations that is investigated at any one time is that portion which is adjacent to central survey electrodes $A_0$. Thus, it can be seen that only a small vertical portion of the surrounding earth formations is investigated at any one instant of time, and thus the depth of central survey electrode $A_0$ must be accurately known before an oil bearing earth strata indicated by the logging tool 10 can be accurately penetrated. The focused electrode tool 10 shown in FIGURE 1 is only an illustrative example and any type of logging tool could be utilized. The logging measurements from logging tool 10 are passed upward through armor multi-conductor cable 12 via conductors 15 and 16 to recorder 14, at the surface of the earth from the electrical circuitry contained within logging tool 10.

If now the three-electrode focused electrode tool 10 were withdrawn from the borehole after a first logging run, which log was recorded in recorder 14, and another logging run made with another type of logging tool, as for example, a sonic or induction logging tool, which second log was run concurrently with a playback of the first run log, it can be seen that the depth of the two logs must coincide exactly for the computed information obtained from both of the logs together to be useful. If the two logs are out of depth synchronism, the computations obtained from the combined logs may be erroneous and misleading.

Before any apparatus can be constructed to provide depth correction of a tool on the end of an elastic cable thousands of feet in the earth, the equation describing the motion of that tool in the borehole must first be ascertained. This equation, which has been solved in the above named co-pending application of William E. Bowers et al., is:

$$.4ML\ddot{u} + .4BL\dot{u} + \frac{1}{EL}u = \Delta t \quad (1)$$

where M is the mass of the cable per unit length in slugs per foot, L is the length of the cable in feet, B is the viscous damping on the cable, E is the stretch coefficient of the cable in feet per feet per pound, $\Delta t$ is the change in tension from a reference tension between the cable and the tool in pounds, $u$ is the displacement in feet of the tool caused by the change in tension, $\dot{u}$ is $du/dt$, and $\ddot{u}$ is $du^2/dt^2$, $t$ being time.

Looking now at FIGURE 1, there is shown the apparatus for determining the tension between the cable 12 and the logging tool 10, transmitting a signal representative of this tension to the surface of the earth, computing the depth error $u$, and correcting the depth drive to the recorder.

The depth correction downhole circuitry is contained within a fluid-tight housing unit 16 within the head of the logging device 10. The electrical schematic of the downhole depth correction circuitry is shown contained within dotted line enclosure 16, which corresponds to the fluid-tight housing unit 16. There is shown the tention device 17 located in the top portion of the logging tool 10. Tension device 17 has two semi-conductor strain-gage elements $R_2$ and $R_4$. The resistances of semiconductor strain-gage elements $R_2$ and $R_4$ will vary as the tension between logging tool 10 and cable 12 varies. Shown within the housing unit 16 is a bridge circuit 18, comprising resistor elements $R_1$ and $R_3$ and semi-conductor strain-gage elements $R_2$ and $R_4$, reperesented as dotted lines in bridge circuit 18. Resistance elements $R_1$ and $R_3$ are non-strain-gage type gages, used for temperature and linearity compensation. An oscillator 19 is shown connected to the junction between resistor element $R_3$ and semi-conductor strain-gage element $R_2$ and the junction between resistor element $R_1$ and semi-conductor strain-gage element $R_4$. The input to a downhole amplifier 20 is connected between the junction between resistor element $R_3$ and semi-conductor strain-gage element $R_4$ and the junction between resistor element $R_1$ and semiconductor strain-gage element $R_2$.

The DC power input to oscillator 19 and amplifier 20 is supplied by way of conductor 21 through armored multi-conductor cable 12 from DC power supply 22 at the surface of the earth. The output from downhole amplifier 20 is connected to conductor 21 through a DC blocking capacitor 48, located within downhole housing unit 16. Conductor 21 is shown separate from armored multi-conductor cable 12 for purposes of clarity of the electrical schematic portion of FIGURE 1, but is actually located therein. The input to an amplifier 23 at the surface of the earth is supplied through a DC blocking capacitor 49 from conductor 21. One output from amplifier 23 is connected to the input of a detector 24. The output of detector 24 is connected to the input of an analog computer 26. The output from analog computer 26 is connected to a junction point 27. The output from junction point 27 is connected to an amplifier 28a and servo motor 28b. The mechanical output of servo motor 28b is supplied through a junction point 50 to a differential gear 29. Junction point 50 also supplies the mechanical output of servo motor 28b to rotate the wiper arm of potentiometer 51. A battery 52 having a grounded negative terminal is connected across the resistance portion of potentiometer 51. The wiper arm of potentiometer 51 is electrically connected to a negative junction of junction point 27 thus providing a negative feedback to amplifier 28a.

There is also shown in FIGURE 1 a depth measuring device 30 which determines the true average depth of tool 10 within the borehole and provides a mechanical rotational output to junction point 54 indicative of the movement of the cable 12 in and out of the borehole. This rotational input to junction point 54 is indicative of the true average depth of tool 10 within the borehole. The rotational outputs from junction point 54 are connected to the input of the differential gear 29 by a shaft 46 and to a gear 31. The mechanical rotational output of gear reducer 31 is connected to portions of analog computer 26 by shaft 38, the purposes of this mechanical connection to be explained in further detail later.

The mechanical rotational output from differential gear 29 is connected to recorder 14 by shaft 47. Shaft 47 is shown rotatively connected to chart 32 within recorder 14 to move chart 32 as shaft 47 rotates. The logging readings supplied via conductors 15 and 16 to galvonometer unit 33 within recorder 14 are recorded on chart 32. Shaft 47 is also connected to a depth indicating mechanism 34 which places a mark on chart 32 at set intervals of depth as determined by the rotation of shaft 47.

Now concerning the operation of the depth correction system of FIGURE 1, the semi-conductor strain-gage elements $R_2$ and $R_4$ of tension device 17 will vary in resistance as the tension between logging device 10 and cable 12 varies. Oscillator 19, which supplies a constant voltage output at a constant frequency, supplies the power to bridge circuit 18. The output voltage from bridge circuit 18 to amplifier 20 will vary as the resistance of semiconductor strain-gage elements $R_2$ and $R_4$ vary. By having two semi-conductor strain-gage elements, the output to amplifier 20 will have twice the magnitude as compared with just one semiconductor strain-gage element. The output amplitude from amplifier 20 will vary in proportion to the tension registered by tension device 17.

The DC power for oscillator 19 and amplifier 20 is supplied over the same conductor, i.e., conductor 21, that carries the output signal from amplifier 20 within housing unit 16 to amplifier 23 at the surface of the earth. Capacitors 48 and 49 filter the DC from amplifiers 20 and 23. Thus, it is possible by this means to use only one conductor for the downhole tension measurements, thus saving space within multi-conductor cable 12 where space is at a premium.

After amplification by amplifier 23, the downhole tension signal is applied to detector 24. The output of the detector 24 provides a DC voltage proportional to downhole tension which is fed to analog computer 26.

Before proceeding with the discussion of the depth correction to be made by analog computer 26, it would be helpful at this time to discuss the basis for the depth corrections to be made. The mechanical rotational output from depth measuring device 30 is assumed to be an accurate representation of average depth taking into account average values of cable stretch as determined by known methods, as for example, that shown in U.S. Patent No. 3,067,519 granted to G. Swift on Dec. 11, 1962, or U.S. Patent No. 3,027,649 granted to R. W. Sloan on Apr. 3, 1962. This true average depth indication is supplied to junction point 54 which provides rotational outputs to differential gear 29 and gear 31. However, this true average depth indication does not provide for depth errors caused by erratic motion of the tool 10, as for example, when it becomes caught on the sides of the borehole 11. A tension created by such erratic tool motion is substantially delayed from reaching the surface of the earth due to the great length of cable 12 between the tool 10 and the surface of the earth. In addition, the tension on the cable at the tool caused by such erratic tool motion is vastly distorted before reaching the surface of the earth due to the damping of the cable. Thus, the need is seen for adding a function to the true average depth output from depth measuring device 30, which function represents erratic tool motion.

Before a logging run into the borehole 11, the output of detector 24 is set at zero volts with the cable 12 and tool 10 lowered into the borehole 11 in the drilling mud 13 under steady state conditions, i.e., no forces acting on the cable 12 or tool 10 other than their own weight and the buoyant force of drilling mud 13. Therefore, the output from detector 24 is a DC voltage representing the change in downhole tension from this steady state condition and thus represents instantaneous depth changes caused by erratic tool motion.

Analog computer 26 must be adapted to solve Equation 1 and provide an output voltage indicative of the depth error $u$. To solve Equation 1, a signal indicative of the second derivative $\ddot{u}$ of the depth error $u$ must be applied to a series of integrating circuits to obtain the rate of change of depth $\dot{u}$ and the depth error $u$. Therefore, we must solve for the second derivative $\ddot{u}$ of depth error $u$ from Equation 1. Rearranging Equation 1, we have:

$$\ddot{u} = \frac{\Delta t}{.4ML} - \frac{B\dot{u}}{M} - \frac{u}{.4ML^2E} \qquad (2)$$

However, looking at Equation 2, it can be seen that each of the terms $\Delta t$, $\dot{u}$ and $u$ have variables. The $\Delta t$ portion of Equation 2 has a length L term in the denominator, thereof, the $\dot{u}$ term has a damping coefficient term B in the numerator, and the $u$ portion of Equation 2 has an $L^2$ term and a cable stretch coefficient E term in the denominator thereof. The L terms represent the length between the surface of the earth and the logging tool 10 within the borehole, which varies as the logging tool 10 is raised or lowered in the borehole 11. The damping coefficient B term is a function of the viscosity of the drilling mud 13 located within the borehole and varies from borehole to borehole, but remains constant within any given borehole. The cable stretch coefficient E term varies for different types of cables, but remains constant for any given cable. Therefore concerning the B and E terms, a variable component could be adjusted before a run into the borehole and would remain constant for the remainder of the logging run within that borehole.

However the length L terms vary as the logging device 10 is raised or lowered in the borehole and thus more elaborate means must be provided to incorporate this length L term into the solution of Equation 2. It would be desirable to incorporate this length L term into analog computer 26 with a minimum of equipment and preferably with a component that varies directly as the length L varies. It is possible to provide potentiometers which vary as the inverse of a function and the inverse of the function squared, but these potentiometers are difficult and expensive to construct in order to obtain the desired accuracy. For example, when the length L is zero, the resistance should be infinity, and when the length L is very great, the resistance should be very small, especially for the $1/L^2$ term. Thus, it would be desirable to provide an analog computer circuit in which the length L terms can be provided by potentiometers which vary directly as the length L varies.

Looking now at FIGURE 2, there is shown the analog computer circuit 26 which solves Equation 2 and provides the length L terms by potentiometers which vary directly as the length L. The output of detector 24 is connected to a fixed resistor $R_{11}$, the other side of which is connected to a point X. The point X is connected to a high input impedance amplifier, whose output is connected to one side of the resistance portion of the potentiometer $R_{14}$, the other side of the resistance portion of potentiometer $R_{14}$ being connected to ground. The wiper arm of potentiometer $R_{14}$ is connected through a fixed resistor $R_{13}$ back to the point X. The output of amplifier $A_1$ is also connected through a fixed resistor $R_6$ to a point Y. The point Y is connected to a high input impedance amplifier $A_2$. The output of amplifier $A_2$ is connected to one side of the resistance portion of a potentiometer $R_7$, the other side of the resistance portion of $R_7$ being connected to ground. The wiper arm of potentiometer $R_7$ is connected through a fixed resistor $R_5$ back to the point Y. The output of amplifier $A_2$ is also connected through a capacitor $C_1$ back to the point Y.

The output of amplifier $A_2$ is also connected through a fixed resistor $R_8$ to a point Z. The point Z is connected to the input of a high input impedance amplifier $A_3$, the output of which is connected through a voltage dividing network comprising the resistance portion of a potentiometer $R_9$ and resistor $R_{10}$ to ground. A wiper arm 57 of potentiometer $R_9$ is connected to the side of the resistance portion of potentiometer $R_9$ which is connected to the output of amplifier $A_3$. The junction point between the resistance portion of $R_9$ and resistor $R_{10}$ is connected to a first side of the resistance portion of a potentiometer $R_{12}$, the other side of the resistance portion of potentiometer $R_{12}$ being connected to the point X. The first side of potentiometer $R_{12}$ is also connected to a wiper arm 56 of potentiometer $R_{12}$. The output of amplifier $A_3$ is also connected through a capacitor $C_2$ back to the point Z. The output of amplifier $A_3$ is also connected to junction point 27 of FIGURE 1. The wiper arm of potentiometer $R_{14}$ and the wiper arm 56 of potentiometer $R_{12}$ are connected to the common shaft 38 which is connected to gear reducer 31 of FIGURE 1. Thus, the wiper arm of potentiometer $R_{14}$ and the wiper arm 56 of potentiometer $R_{12}$ rotate across the resistance portions of potentiometers $R_{12}$ and $R_{14}$ with the rotation of shaft 38.

Looking at the input X to amplifier $A_1$ we know that the sum of the currents into the point X must be equal to 0. Since the input impedance of amplifier $A_1$ is very high compared to the summing and feedback resistors, the current into the amplifier can be neglected. We can write the equation for the current into the point X as:

$$\frac{\Delta t}{R_{11}} + \frac{\alpha e_0}{R_{13}} + \frac{ku}{\alpha R_{12}} = 0 \qquad (3)$$

where $e_0$ is the output voltage from amplifier $A_1$ and $\alpha$ designates that portion of potentiometer $R_{12}$ between the high side thereof and wiper arm 56 of potentiometer $R_{12}$, and that portion of potentiometer $R_{14}$ between ground and the wiper arm of potentiometer $R_{14}$. Also, $k$ is equal to $$\frac{R_{10}}{R_9 + R_{10}}$$

The resistance values of the potentiometers (i.e., $R_7$, $R_9$, $R_{12}$ and $R_{14}$) designate the entire resistance of the resistance portions of the respective potentiometers.

Solving for $e_0$ from Equation 3:

$$e_0 = \frac{-\Delta t R_{13}}{\alpha R_{11}} - \frac{ku R_{13}}{\alpha^2 R_{12}} \qquad (4)$$

Looking at the first term on the right hand side of the equal sign of Equation 4 and from the $\Delta t$ term of Equation 2, we can write the relationship:

$$\frac{R_{13}}{\alpha R_{11}} = \frac{1}{.4ML} \quad (5)$$

From the $u$ term of Equation 4 and the $u$ term of Equation 2, we can write the relationship:

$$\frac{kR_{13}}{\alpha^2 R_{12}} = \frac{1}{.4ML^2E} \quad (6)$$

Thus, looking at Equations 5 and 6, if $\alpha$ is set proportional to L, it can be seen that the resistance portions of the potentiometers can be directly linear and shaft 38 can drive the wiper arm of potentiometer $R_{14}$ and wiper arm 56 of potentiometer $R_{12}$ to obtain the L and $L^2$ terms of Equation 2. Thus, no inverse or inverse squared term potentiometers are required in the FIGURE 2 circuit. Also, the wiper arm 57 of potentiometer $R_9$ can be initially set proportional to the cable stretch coefficient E.

Looking now at the output $e_1$ of amplifier $A_2$, we can write the relationship:

$$e_1 = \frac{1}{C_1} \int i_1 dt \quad (7)$$

where $i_1$ is the current through capacitor $C_1$. Taking the Laplace transform of Equation 7, we have:

$$e_1 = \frac{1}{C_1 s} I_1 \quad (8)$$

Solving for $I_1$, we can write:

$$I_1 = e_1 C_1 s \quad (9)$$

Looking now at the input to amplifier $A_2$, designated Y, since the sum of the currents into point Y equals 0 and the input impedance to amplifier $A_2$ is very high, we can write the current relationship:

$$\frac{\beta e_1}{R_5} + e_1 C_1 s + \frac{e_0}{R_6} = 0 \quad (10)$$

Looking at the integrating circuit from the output $e_0$ of amplifier $A_1$ to capacitor $C_1$ only, and neglecting for a moment the feedback path through resistor $R_5$, we can write the relationship:

$$\frac{e_0}{R_6} + e_1 C_1 s = 0 \quad (11)$$

Thus, solving for $e_1$:

$$e_1 = \frac{-e_0}{R_6 C_1 s} = \frac{-1}{R_6 C_1} \int e_0 dt \quad (12)$$

The relationship given by Equation 12 gives the effect of the integrating circuit comprising amplifier $A_2$ and capacitor $C_1$ on the output $e_0$ of amplifier $A_1$ with $R_6$ and $C_1$ providing the time constant of the integrating circuit. If point Y is designated as the second derivative $\ddot{u}$ of the depth error $u$, we known that the output $e_1$ of amplifier $A_2$ will be proportional to the negative value of the first derivative $\dot{u}$ of the depth error $u$. The signal at the wiper arm of $R_7$ is then $\beta \dot{u}$ and is added to the input of the amplifier $A_2$ through resistor $R_5$. Thus, the equation for the current at point Y is:

$$\frac{\beta \dot{u}}{R_5} + e_1 C_1 s + \frac{e_0}{R_6} = 0 \quad (13)$$

Solving for the output $e_1$ of amplifier $A_2$ from Equation 13, we have:

$$e_1 = \frac{-e_0}{R_6 C_1 s} - \frac{\beta \dot{u}}{R_5 C_1 s} \quad (14)$$

Thus taking the inverse Laplace transform of Equation 14, we have:

$$e_1 = \frac{-1}{R_6 C_1} \int e_0 dt - \frac{\beta}{R_5 C_1} \int \dot{u} dt \quad (15)$$

From Equation 2, we know that $\dot{u}$ is multiplied by the term $B/M$. Since the last term on the right hand side of the equal sign in Equation 15 is the first derivative $\dot{u}$ component of the depth error $u$ which is supplied to point Y (i.e. $\dot{u}$), we can determine the relationship for $B/M$ in terms of circuit components as:

$$\frac{B}{M} = \frac{\beta}{R_5 C_1} \quad (16)$$

Thus by equating $\beta$ to B when M is equal to $R_5 C_1$ we can vary the potentiometer $R_7$ to obtain the correct value of B for any given borehole.

Looking now at the input Z to amplifier $A_3$, we can write the equation for the currents into point Z as:

$$e_2 C_2 s + \frac{e_1}{R_8} = 0 \quad (17)$$

where $e_2$ is the output voltage from amplifier $A_3$. Solving for $e_2$, we have:

$$e_2 = \frac{-e_1}{R_8 C_2 s} \quad (18)$$

Taking the inverse Laplace transform of Equation 18, we have:

$$e_2 = -\frac{1}{R_8 C_2} \int e_1 dt \quad (19)$$

Since $e_1 = \dot{u}$, we know that $e_2$ must be proportional to $u$, with $R_8$ and $C_2$ determining the gain for the integrating circuit.

Thus, it can be seen that the output $e_0$ from amplifier $A_1$ contains the $\Delta t$ and $u$ portions of Equation 2 and the current through resistor $R_5$ contains the $\dot{u}$ portion of Equation 2. Thus, the voltage at the input to amplifier $A_2$, from Equation 2 is equal to the second derivative $\ddot{u}$ of the depth error $u$. The output $e_1$ of amplifier $A_2$ provides the first derivative $\dot{u}$ of the depth error $u$ after integration. The output voltage $e_2$ from amplifier $A_3$ provides the depth error $u$ after integration.

Referring back to FIGURE 1, the depth error $u$ output from integrator 41 is supplied to junction point 27 and then to amplifier 28a. Servo motor 28b provides a mechanical output to junction point 50 proportional to the signal supplied from junction point 27. One mechanical rotational output from junction point 50 is used to drive the wiper arm of potentiometer 51. The voltage on the wiper arm of potentiometer 51 which depends on the point on the resistance portion of potentiometer 51 which the wipe arm is contacting, is thus proportional to the position of shaft 45 which is connected to differential gear 29. This signal from the wiper arm of potentiometer 51 is subtracted by junction point 27 from the signal which is supplied to junction point 27 from analog computer 26 and the resultant signal is supplied to amplifier 28a. Thus it can be seen that servo motor 28b provides a mechanical output through junction point 50 to shaft 45 as long as there is a signal applied to amplifier 28a from junction point 27. The position of shaft 45 will at all times be substantially equal to the depth error $u$ as calculated by analog computer 26.

The differential gear 29 adds the rotation of shafts 45 and 46 representing the depth error $u$ and the true average depth L respectively, and provides a rotational output to recorder 14 on shaft 47, which rotation is equal to the sum of $L+u$. This value of $L+u$ provides the corrected depth indication to chart 32 of recorder 14. Shaft 47 is also connected to depth indicator 34 which provides depth indications on chart 32 at given intervals. The logging readings supplied by conductors 15 and 16 through armored multi-conductor cable 12 from the logging tool 10 within the borehole, are supplied to galvanometer unit 33 which provides visual markings on chart 32 indicative of the logging readings. Thus, it can be seen that the logging readings provided by galvanometer unit 33 can be correlated with the true depth markings as provided by depth indicator 34.

It can now be seen that by means of the apparatus of the present invention, the depth error $u$ can be determined at all times and the recording equipment at the surface of the earth can be continuously corrected to provide an indication of the actual instantaneous depth of the logging tool in the borehole by providing indications of the downhole tension to computing and correction apparatus at the surface of the earth. Thus, the error in correcting erratic tool motion using surface tension measurements due to distortion and delay caused by the tension at the logging tool traveling through thousands of feet of cable will be corrected. Therefore, the exact depth of oil bearing strata can be accurately determined, and the correlation of two or more logging runs can now be made very accurate to provide data for determining where oil bearing strata are located along with accurate determinations of the amount of oil in those oil bearing stratas. It is to be understood that a tension device could alternatively be located between two segments of the cable rather than between the cable and tool and still be within the scope of the invention, although the accuracy may be less as the distance from the tool increases. In this case, the length L of Equation 2 would be considered from the tension device to the surface rather than from the tool to the surface, all other parameters being the same.

While there has been described what is at present considered to be the preferred embodiment of this invention, it will be obvious to those skilled in the art that various changes and modifications may be made therein without departing from the invention, and it is therefore, intended to cover all such changes and modifications as fall within the true spirit and scope of the invention.

What is claimed is:
1. Apparatus for determining the changes in depth of a tool on the end of a cable in a borehole, comprising:
    (a) first means for measuring at least a fraction of the tension on the cable at a point below the surface of the earth to produce a tension measurement;
    (b) second means for generating a first signal representative of a function of the depth of a tool in a borehole; and
    (c) third means responsive to the tension measurement and the first signal for generating a second signal indicative of the changes in depth of a tool relating to the measured tension, the third means including linearly variable means responsive to the first signal for varying a parameter of the linearly variable means directly as a function of depth whereby said second signal will be a function of measured tension and tool depth.

2. The apparatus of claim 1 wherein the third means generates the second function $u$ in response to the tension measurement $\Delta T$ and the first signal L according to the relationship:

$$u = EL\Delta T - C_1 BEL^2 \frac{du}{dt} - C_2 EML^2 \frac{d^2u}{dt^2}$$

where E is the stretch coefficient of the cable, M is the mass of the cable, B is the damping coefficient, $C_1$ and $C_2$ are constants, and $t$ is time, said depth function terms L and $L^2$ being accounted for by the variable parameter of said linearly variable means.

3. The apparatus of claim 1 and further including:
    (d) means responsive to the first and second signals for generating a third signal representative of the instantaneous changes in depth of a tool in a borehole.

4. The apparatus of claim 1 wherein the linearly variable means comprises linear impedance potentiometer means whose wiper arm is moved in response to said first signal.

References Cited
UNITED STATES PATENTS

| | | |
|---|---|---|
| 3,027,649 | 4/1962 | Sloan. |
| 2,934,695 | 4/1960 | Maulsby _____ 324—34 |
| 2,794,951 | 6/1957 | Broding et al. _____ 324—34 |

LEONARD FORMAN, Primary Examiner

F. J. D'AMBROSIO, Assistant Examiner